(12) United States Patent
Morgan et al.

(10) Patent No.: US 10,378,434 B2
(45) Date of Patent: Aug. 13, 2019

(54) VARIABLE TURBINE GEOMETRY TURBOCHARGER VANE RING ASSEMBLY RETENTION DEVICE

(71) Applicant: BorgWarner Inc., Auburn Hills, MI (US)

(72) Inventors: Elias Alan Morgan, Leicester, NC (US); Greg Williams, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 539 days.

(21) Appl. No.: 14/986,762

(22) Filed: Jan. 4, 2016

(65) Prior Publication Data

US 2016/0195006 A1 Jul. 7, 2016

Related U.S. Application Data

(60) Provisional application No. 62/100,620, filed on Jan. 7, 2015.

(51) Int. Cl.
| | |
|---|---|
| *F01D 17/16* | (2006.01) |
| *F02B 37/04* | (2006.01) |
| *F02B 37/24* | (2006.01) |
| *F04D 29/46* | (2006.01) |
| *F04D 25/02* | (2006.01) |
| *F02C 6/12* | (2006.01) |

(52) U.S. Cl.
CPC ............ *F02B 37/24* (2013.01); *F01D 17/165* (2013.01); *F02B 37/04* (2013.01); *F02C 6/12* (2013.01); *F04D 25/024* (2013.01); *F04D 29/462* (2013.01); *F05D 2220/40* (2013.01); *F05D 2260/30* (2013.01); *Y02T 10/144* (2013.01)

(58) Field of Classification Search
CPC .. F02B 37/04; F02B 37/24; F02C 6/12; F05D 2220/40; F04D 25/024; F04D 29/462; F01D 17/165
See application file for complete search history.

(56) References Cited

U.S. PATENT DOCUMENTS

| | | | | |
|---|---|---|---|---|
| 5,146,752 | A * | 9/1992 | Bruestle ................ | F01D 17/105 415/164 |
| 7,021,057 | B2 * | 4/2006 | Sumser ................. | F01D 17/165 415/163 |
| 7,121,788 | B2 * | 10/2006 | Daudel ................. | F01D 17/165 415/159 |
| 8,061,976 | B2 * | 11/2011 | Hall ...................... | B23P 19/084 415/160 |
| 8,112,995 | B2 * | 2/2012 | Pappakurichi Santhanam ............ | F01D 17/165 415/159 |
| 8,376,695 | B2 * | 2/2013 | Scholz ................. | F01D 17/165 415/164 |

(Continued)

*Primary Examiner* — Christopher S Bobish
(74) *Attorney, Agent, or Firm* — BrooksGroup

(57) ABSTRACT

A variable turbine geometry turbine turbocharger (1) includes a vane ring assembly (29) configured to control flow of exhaust gas to a turbine wheel (12), and retainers (60, 160) that are used to secure the vane ring assembly (29) to the bearing housing (16) in a desired axial and radial position and angular orientation relative to the bearing housing (16). In some embodiments, the vane ring assembly (29) is spring biased toward an axially outward position relative to the bearing housing (16), and the retainers (60, 160) retain the vane (30) ring in the desired position against the spring bias.

10 Claims, 10 Drawing Sheets

(56) References Cited

U.S. PATENT DOCUMENTS

| | | | | |
|---|---|---|---|---|
| 8,684,678 B2* | 4/2014 | Fleig | ............... | F01D 17/165 |
| | | | | 415/160 |
| 8,920,114 B2* | 12/2014 | Ramb | ............... | F01D 17/165 |
| | | | | 415/160 |
| 9,163,557 B2* | 10/2015 | Blummel | ............... | F01D 17/165 |
| 9,695,702 B2* | 7/2017 | Fleig | ............... | F01D 9/04 |
| 9,903,220 B2* | 2/2018 | Mayernick | ............... | F01D 17/165 |
| 9,982,557 B2* | 5/2018 | Ward | ............... | F01D 17/165 |
| 2010/0166541 A1* | 7/2010 | Hausser | ............... | F01D 17/165 |
| | | | | 415/148 |
| 2010/0232937 A1* | 9/2010 | Wengert | ............... | F01D 17/165 |
| | | | | 415/160 |
| 2011/0182749 A1* | 7/2011 | Schall | ............... | C22C 38/001 |
| | | | | 416/241 R |
| 2012/0301288 A1* | 11/2012 | Maier | ............... | F01D 17/165 |
| | | | | 415/208.1 |
| 2013/0036733 A1* | 2/2013 | Severin | ............... | F01D 17/165 |
| | | | | 60/605.1 |
| 2014/0321991 A1* | 10/2014 | Ihli | ............... | F01D 17/165 |
| | | | | 415/151 |
| 2015/0016968 A1* | 1/2015 | Grabowska | ............... | F02B 37/24 |
| | | | | 415/148 |
| 2016/0090858 A1* | 3/2016 | Barthelet | ............... | F01D 17/16 |
| | | | | 417/406 |

* cited by examiner

VARIABLE TURBINE GEOMETRY TURBOCHARGER VANE RING ASSEMBLY RETENTION DEVICE

CROSS-REFERENCE TO RELATED APPLICATIONS

This application claims priority to and all the benefits of U.S. Provisional Application No. 62/100,620, filed on Jan. 7, 2015, and entitled "Variable Geometry Turbocharger Vane Ring Assembly Retention Device", which is incorporated herein by reference

FIELD OF THE INVENTION

Embodiments are generally related to turbochargers and, more particularly, to a vane ring assembly including a retaining device for use in variable turbine geometry (VTG) turbochargers.

BACKGROUND

Exhaust gas turbochargers are provided on an engine to deliver air to the engine intake at a greater density than would be possible in a normal aspirated configuration. Turbochargers typically include a turbine housing connected to the exhaust manifold of the engine, a compressor housing connected to the intake manifold of the engine, and a bearing housing coupled between the turbine and compressor housings. A turbine wheel in the turbine housing is rotatably driven by an inflow of exhaust gas supplied from the exhaust manifold. A shaft rotatably supported in the bearing housing connects the turbine wheel to a compressor impeller in the compressor housing so that rotation of the turbine wheel causes rotation of the compressor impeller. Rotation of the compressor impeller increases the air mass flow rate, airflow density and air pressure delivered to cylinders of the engine via the intake manifold.

Thus, turbochargers deliver compressed air to an engine allowing fuel to combust more efficiently. A diesel engine operates at higher air-to-fuel ratios with higher efficiency compared to other engine cycles. Turbocharging is an efficient approach to increasing air-to-fuel ratio for the diesel engine combustion cycle. In the case of other engine configurations and combustion cycles, turbocharging is an effective method for increasing power density. An increase in power density allows the use of smaller, lighter engines at similar power levels. The use of a smaller engine in a vehicle decreases the mass of the vehicle, increases performance, and enhances fuel economy. Moreover, turbochargers provide a more complete combustion of the fuel delivered to the engine, which reduces engine emissions.

SUMMARY

In some aspects, a variable turbine geometry turbocharger includes a bearing housing including a bore that defines a longitudinal axis, and a turbine housing secured to the bearing housing. The turbine housing defines an exhaust gas inlet, an exhaust gas outlet and a volute disposed between the exhaust gas inlet and the exhaust gas outlet. The turbocharger includes a turbine wheel disposed in the turbine housing between the volute and the exhaust gas outlet, and a vane ring assembly disposed in the turbine housing between the volute and the turbine wheel. The vane ring assembly includes pivotable vanes disposed about the circumference of the turbine wheel and controlling the flow of exhaust gas to the turbine wheel. The turbocharger also includes a retainer that secures the vane ring assembly to the bearing housing.

The turbocharger includes one or more of the following features: at least three retainers that are spaced apart along a circumference of a vane ring assembly; the retainers including a first end that is fixed to the bearing housing and a second end that engages a corresponding slot on the vane ring assembly; a bearing housing including surface features that engage the first end of the retainer, whereby the retainer serves to retain the vane ring assembly in a predetermined rotational orientation relative to the bearing housing; the retainer first end is axially spaced relative to the retainer second end, whereby the retainer retains the vane ring assembly at a predetermined axial spacing relative to an axially outward-facing end face of the bearing housing; the retainer second end including a radially inward protrusion that engages an axially outward facing surface of the vane ring assembly; the vane ring assembly being spring biased toward an axially outward position relative to the bearing housing, and the retainer retains the vane ring in a desired axial position relative to the bearing housing against the spring bias; and the retainer second end including a groove that receives a portion of the vane ring assembly.

The turbocharger may also include one or more of the following additional features: the vane ring assembly comprising an upper vane ring disposed between the vanes and the bearing housing, and a lower vane ring that is axially spaced relative to the upper vane ring via spacers, wherein the vanes are disposed between, and supported for rotation on, the upper vane ring and the lower vane ring, and the retainer engages the upper vane ring; the retainer engaging an axially outward facing surface of the upper vane ring; the retainer comprising spaced lugs that interlock with a slot formed in the upper vane ring; the turbocharger including an elastic element compressed between the bearing housing and the vane ring assembly whereby the elastic element applies an axial force to the vane ring assembly that urges the vane ring assembly in a direction away from the bearing housing; the elastic element is an annular plate having an outer end that engages the vane ring assembly, and an inner end that engages the bearing housing; the vane ring assembly including an upper vane ring disposed between the vanes and the bearing housing, and a lower vane ring that is axially spaced relative to the upper vane ring via spacers wherein the vanes are disposed between and supported for rotation on the upper vane ring and the lower vane ring; the elastic element further including an axially protruding ridge adjacent the outer end that extends about a circumference of the outer end, the ridge piloting the elastic element relative to an inner end of the upper vane ring, and the inner end of the elastic element abuts a bearing housing-facing surface of the upper vane ring; and a heat shield is disposed between the elastic element and the turbine wheel.

A turbocharger provides an ideal boost in only a limited range of conditions. Thus, in general, a larger turbine for a given engine provides good boost at high speeds, but does not do well at low speeds because it suffers turbo lag and is thus unable to provide boost when needed. A small turbine provides good boost at low speeds, but can choke the engine at high speeds. One solution to this problem is to provide the turbocharger with a variable turbine geometry (VTG) turbine having a vane pack including pivotable vanes that control exhaust gas flow through the turbine. At low speeds, when boost is needed quickly, the vanes can be closed creating a narrower passage for the flow of exhaust gas. The narrow passage accelerates the exhaust gas towards the turbine wheel blades allowing the turbocharger to provide a boost of power to the engine when needed. On the other hand when the engine is running at high speed and the pressure of the exhaust gas is high, the vanes may be opened and the turbocharger provides the appropriate amount of boost to the engine for the associated speed. By allowing the vanes to open and close, the turbocharger is permitted to operate under a wide variety of driving conditions as power is demanded by the engine.

In some aspects, the vane pack is supported on the bearing housing. Since the vane pack is supported on the bearing housing, the vane pack is thermally decoupled from the turbine housing. This is advantageous relative to some conventional VTG turbine turbochargers in which the vane pack is supported on the turbine housing, whereby the high temperatures experienced by the turbine housing during use are conducted to the vane pack, and sometimes lead to adverse events such distortion of the vane pack and even lock up of the vanes.

By securing the vane pack to the bearing housing using the retainers, improved control over the rotational orientation of the vane pack relative to the bearing housing is obtained, relative to some conventional VTG turbine turbochargers. This is because in some conventional VTG turbine turbochargers, the vane pack is supported by the turbine housing. Although the rotational orientation of the vane pack can be fairly well controlled when it is mounted to the turbine housing, the rotational orientation of the turbine housing relative to the bearing housing is not very well controlled, whereby positioning errors of the vane pack relative to the bearing housing, and thus relative to the actuator and the turbine wheel, can be introduced in some conventional devices. The improved control over the rotational orientation of the vane pack relative to the bearing housing obtained by using the disclosed retainers results in improved vane angle accuracy throughout the turbocharger life.

Improved control over the rotational orientation of the vane pack is at least in part achieved by securing the retainers both to the bearing housing at predetermined locations that are at least partially defined by piloting surface features provided on the bearing housing surface, and to the vane pack at predetermined locations that are defined by retainer-receiving slots formed in an upper vane ring of the vane pack. The features on the bearing housing and the upper vane ring also cooperate to prevent rotation of the assembly during operation.

Advantageously, the retainers retain the vane pack in the desired axial and radial location relative to the bearing housing while not constraining elements of the vane pack from thermally expanding, thereby avoiding introduction of high stresses associated with thermal distortion.

1. BRIEF DESCRIPTION OF THE DRAWINGS

Advantages of the VTG turbocharger disclosed herein will be better understood by reference to the following detailed description when considered in connection with the accompanying drawings wherein.

DETAILED DESCRIPTION OF THE INVENTION

Figure 1:
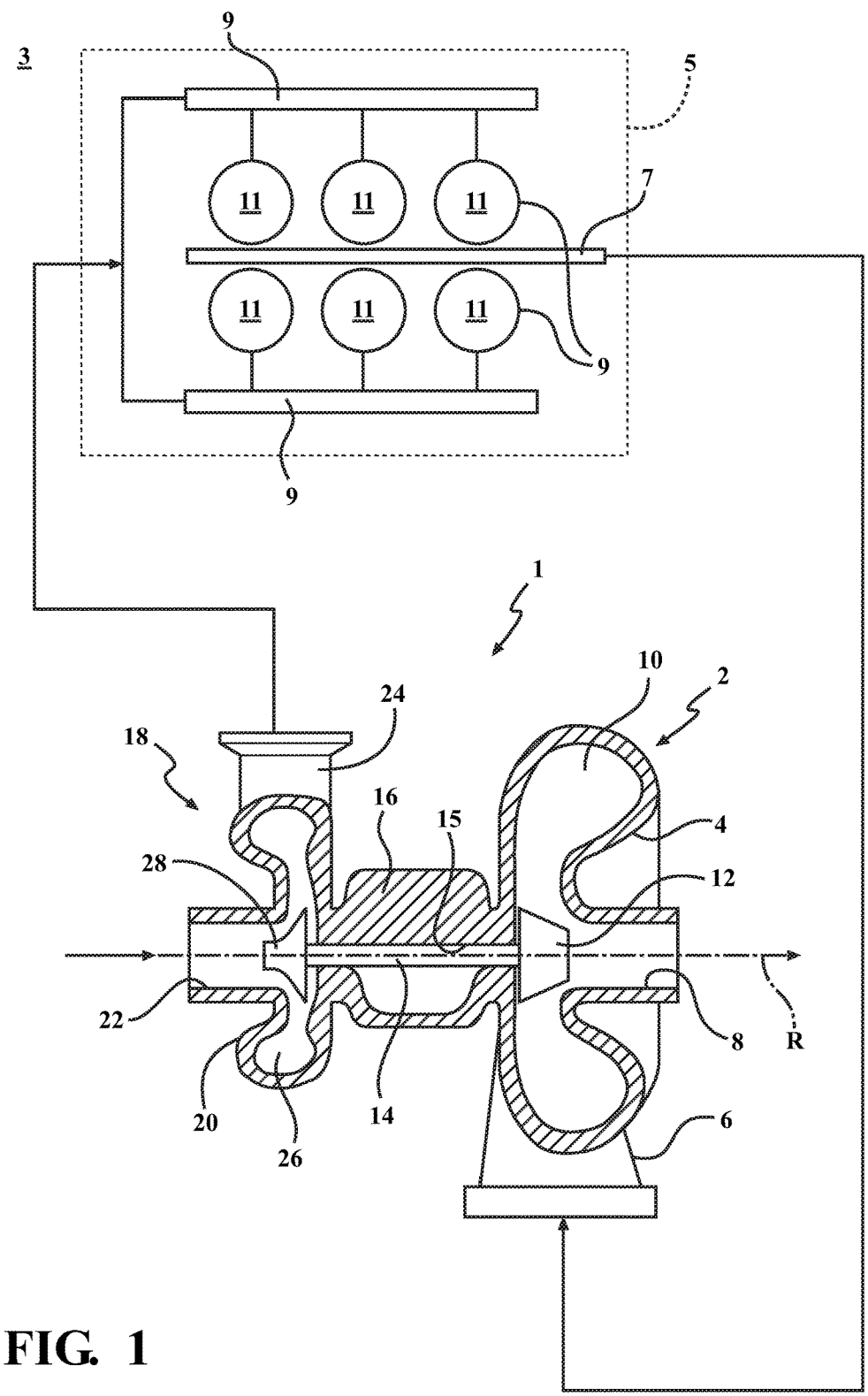
FIG. 1 is a schematic view of an engine system that includes an engine and an exhaust gas turbocharger connected to the engine intake and exhaust lines.

Referring to FIG. 1, an exhaust gas turbocharger 1 is integrated into an engine system 3 of a vehicle (not shown). The turbocharger 1 is connected to an engine 5, and includes a turbine section 2, a compressor section 18, and a bearing housing 16 disposed between and connecting the compressor section 18 to the turbine section 2. The turbine section 2 includes a turbine housing 4 that defines an exhaust gas inlet 6, an exhaust gas outlet 8, and a turbine volute 10 disposed in the fluid path between the exhaust gas inlet 6 and the exhaust gas outlet 8. A turbine wheel 12 is disposed in the turbine housing 4 between the turbine volute 10 and the exhaust gas outlet 8. A shaft 14 is connected to the turbine wheel 12, is supported for rotation about a rotational axis R within a bore 15 formed in the bearing housing 16, and extends into the compressor section 18. The compressor section 18 includes a compressor housing 20 that defines an axially-extending air inlet 22, an air outlet 24, and a compressor volute 26. A compressor wheel 28 is disposed in the compressor housing 20 between the air inlet 22 and the compressor volute 26, and is connected to the shaft 14. The turbine wheel 12, the shaft 14 and the compressor wheel 28 form the main components of a rotating assembly of the turbocharger 1.

In use, the turbine wheel 12 in the turbine housing 4 is rotatably driven by an inflow of exhaust gas supplied from the exhaust manifold 7 of the engine 5. The rotation of the turbine wheel 12 causes rotation of the compressor wheel 28 via the shaft 14. Rotation of the compressor wheel 28 increases the air mass flow rate, airflow density and air pressure delivered to cylinders 11 of the engine via an outflow from the compressor air outlet 24, which is connected to the intake manifold 9 of the engine.

Figure 2:
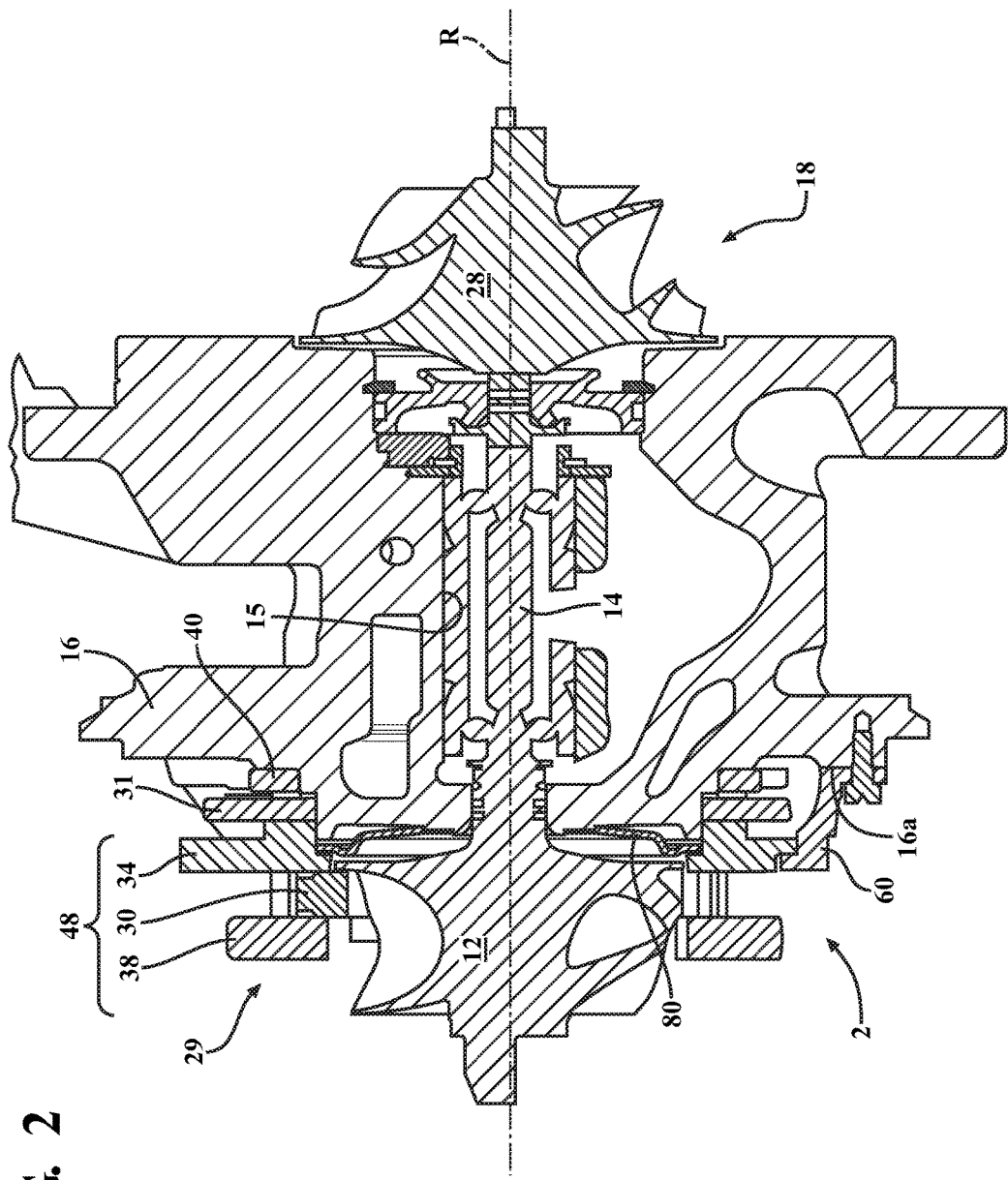
FIG. 2 is a cross-sectional view of the exhaust gas turbocharger of FIG. 1 with the compressor housing and turbine housing omitted for clarity.
Figure 3:
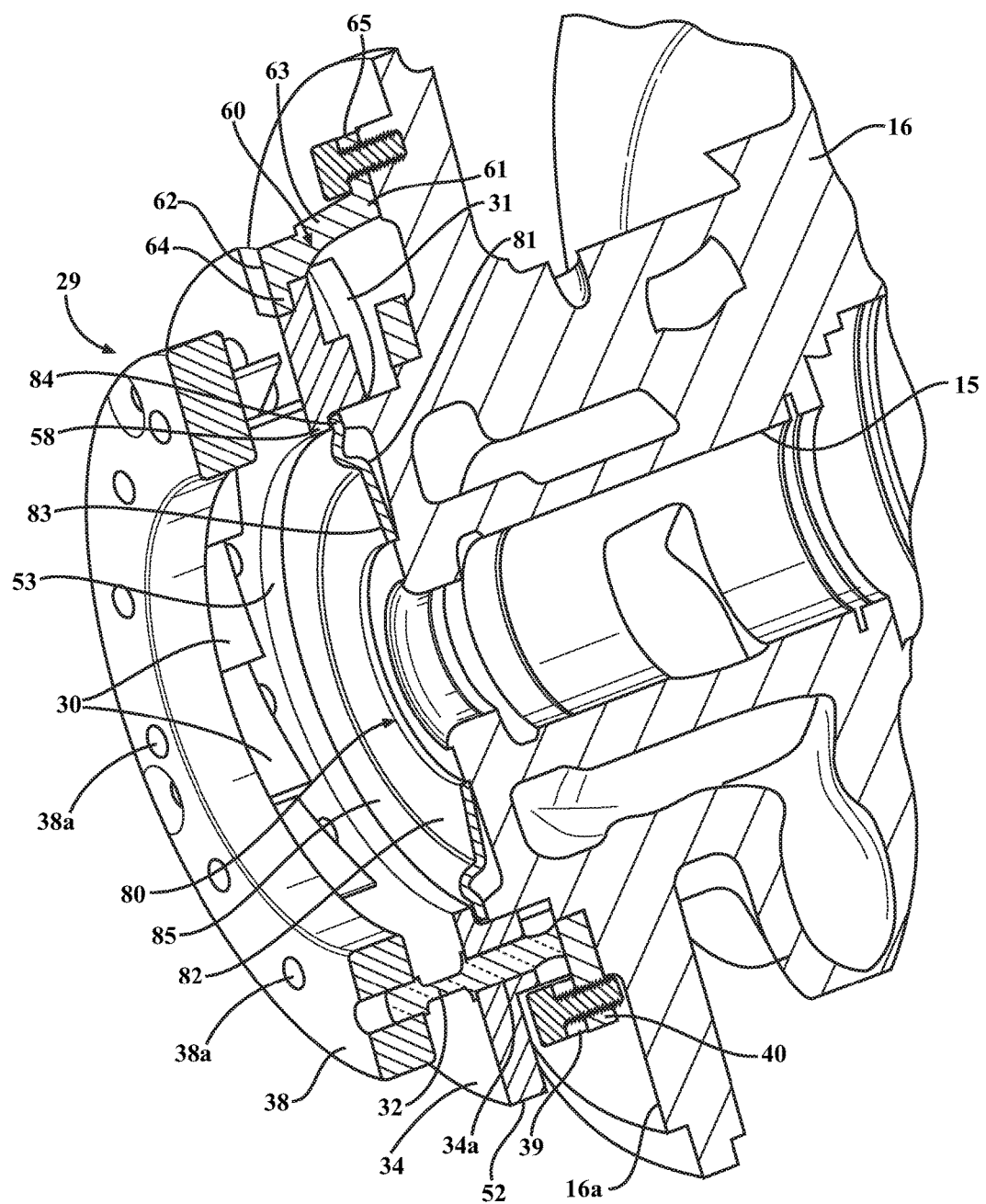
FIG. 3 is an enlargement of a portion of FIG. 2 with the rotating assembly and bearing systems omitted for clarity and showing a cross-sectional view of the vane ring assembly of the exhaust gas turbocharger of FIG. 1.

Referring also to FIGS. 2 and 3, the turbocharger 1 is a variable turbine geometry (VTG) turbocharger. In particular, the turbine section 2 includes a vane ring assembly 29 having plurality of pivotable vanes 30 that control the flow of exhaust gas that impinges on the turbine wheel 12 and thus control the power of the turbine section 2. The vanes 30 also therefore control the pressure ratio generated by the compressor section 18. In engines that control the production of NOx by the use of High Pressure Exhaust Gas Recirculation (HP EGR) techniques, the vanes 30 also provide a means for generating and controlling exhaust back pressure.

The vanes 30 are arranged in a circular array around the turbine wheel 12, and are located between the turbine volute 10 and the turbine wheel 12. The vanes 30 are pivotably supported in this configuration between an upper vane ring 34 disposed on a bearing housing-facing side of the vanes 30, and a lower vane ring 38 disposed on a turbine housing-facing side of the vanes 30. The subassembly consisting of the plurality of vanes 30, the upper vane ring 34 and the lower vane ring 38 is referred to as the vane pack 48.

Each vane 30 rotates on a post 32 that protrudes from the opposed side faces of the vane 30. Opposed free ends of the post 32 are received in respective apertures 38a, 34a in the lower vane ring 38 and the upper vane ring 34. The axial spacing between the upper vane ring 34 and the lower vane ring 38 is maintained via circumferentially-spaced spacers 50 (best seen in FIG. 12A) in the form of rods that extend axially between the upper and lower vane rings 34, 38. In some embodiments, the spacers 50 also connect the upper vane ring 34 to the lower vane ring 38 such that the vane pack 48 can be preassembled and handled as an intact unit. The angular orientation of the upper vane ring 34 relative to the lower vane ring 38 is set such that the corresponding central openings in the vane rings 34, 38 are concentric with the shaft rotational axis R, the posts 32 are parallel to the rotational axis R and the vane 30 is free to rotate about a longitudinal axis of the post 32. Each post 32 on the upper vane ring-side of the vane 30 protrudes through a corresponding aperture 34a of the upper vane ring 34 and is affixed to a vane arm 31, which controls the rotational position of the vane 30 with respect to the vane rings 34, 38.

The orientation of the vanes 30 within the vane pack 48 is controlled using an adjustment ring 40. The adjustment ring 40 is connected to each vane 30 via a pin-and-block assembly 39 that engages the corresponding vane arm 31. Thus, the position of each vane 30 is adjusted in unison with the other vanes 30 as the adjustment ring 40 is rotated about the rotational axis R. The rotational orientation of the adjustment ring 40 about the rotational axis R is controlled by an actuator (not shown) which is operatively connected to rotate the adjustment ring 40 via a linkage (not shown) that engages the adjustment ring 40. The actuator is typically commanded by the engine electronic control unit (ECU).

Figures 4, 5:
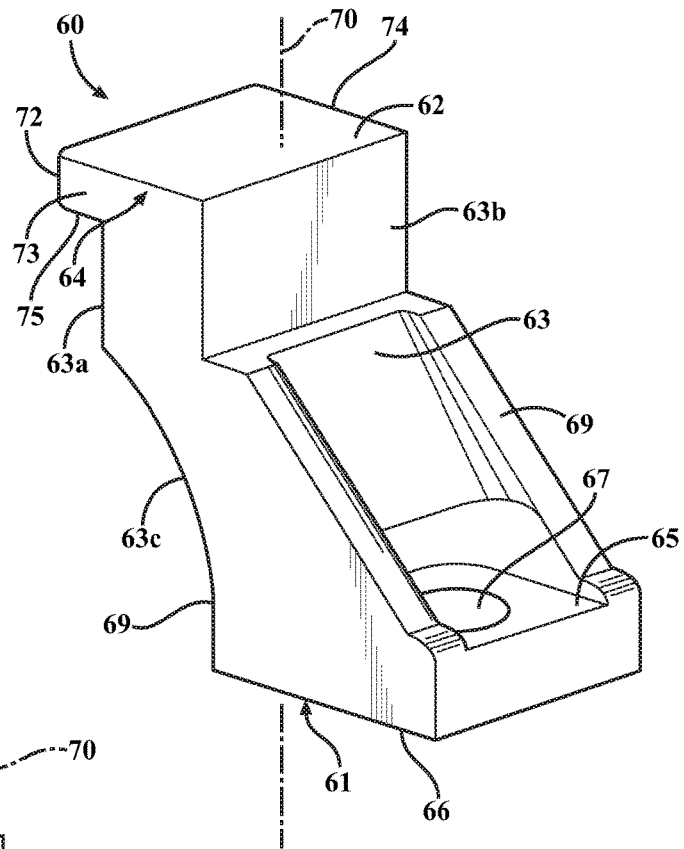
FIG. 4 is a rear perspective view of a retainer used to secure the vane ring assembly to the bearing housing.
FIG. 5 is a side view of the retainer of FIG. 4.
Figure 6:
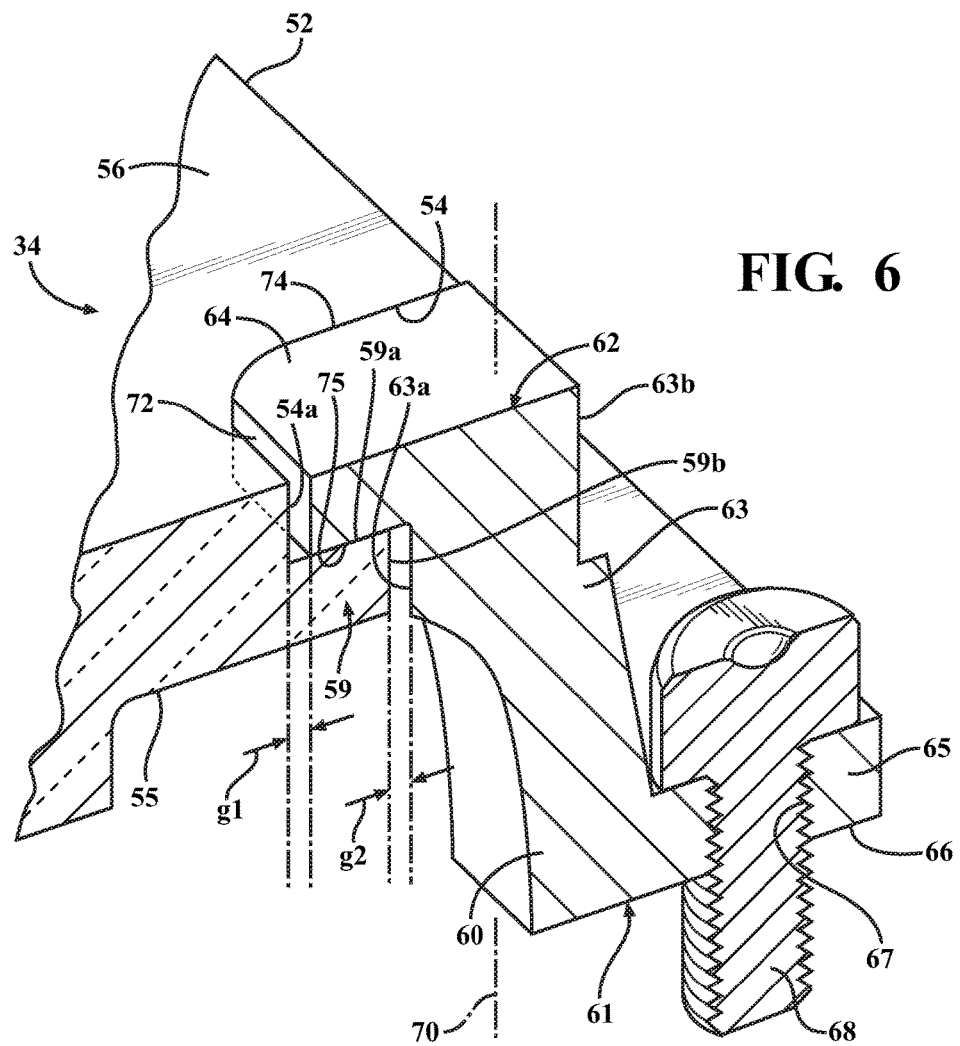
FIG. 6 is a cross-sectional view of the retainer of FIG. 4 engaged with the upper vane ring.

Referring to FIGS. 4-6, in the turbocharger 1, the vane pack 48 is fixed to an axially outward-facing surface 16a of the bearing housing 16 via retainers 60. The retainers 60 are axially elongated lugs that are spaced apart along a circumference of the vane pack 48. In the illustrated embodiment, three equidistantly spaced retainers 60 are used to secure the vane pack 48 to the bearing housing 16.

Each retainer 60 has a first end 61 that is fixed to the axially outward-facing surface 16a of the bearing housing 16, a second end 62 that is opposed to the first end 61 and engages the vane pack 48, and a mid-portion 63 that extends between the first and second ends 61, 62. The mid portion 63 is elongated along a retainer axis 70 that passes through the first and second ends 61, 62. The retainer second end 62 is axially spaced relative to the retainer first end 61, whereby the retainer 60 retains the vane pack 48 at a predetermined axial spacing relative to the surface 16a of the bearing housing 16. The predetermined axial spacing is set such that the vane pack 48 is optimally positioned relative to the turbine wheel.

The retainer first end 61 includes a base 65 that protrudes in a direction transverse to the retainer axis 70. In addition, the second end 62 includes a lip 64 that protrudes in a direction transverse to the retainer axis and in a direction opposite that of the base 65, whereby the retainer 60 is generally "Z"-shaped in profile.

The lip 64 is configured to engage an axially outward-facing surface of the upper vane ring 34. In particular, the lip 64 interlocks with a slot 54 formed in an outer peripheral edge 52 of the upper vane ring 34, as discussed further below. The lip 64 is defined by a portion of the retainer second end 62, a leading edge 72, side edges 73, 74 that adjoin the leading edge 72 and a contact edge 75 that is opposed to the retainer second end 62. The leading edge 72 and the contact edge 75 of the lip 64 and an inner surface 63a of the mid portion 63 in the region adjoining the lip 64 may be precisely machined to ensure proper cooperation with the slot 54.

An outer surface 63b of the mid portion 63 in the region adjoining the second end 62 (e.g., the surface opposed to the lip leading edge 72) has a convex curvature that matches the curvature of an outer diameter of the upper vane ring 34. In addition, an inner surface 63c of the mid portion 63 in a region adjoining the first end 61 has a concave curvature that ensures there is sufficient space for movement of the adjustment ring 40, the vane arms 31 and pin-and-block assemblies 39 during actuation.

The base 65 defines a precisely machined, planar end surface 66 that abuts the bearing housing 16 when in use. The base 65 includes a base through hole 67 that intersects the planar end surface 66. The base through hole 67 is configured to receive a fastener such as a bolt 68 that is used to secure the retainer 60 to the bearing housing 16. The retainer 60 may include triangular stiffening gussets 69 disposed on opposed sides of the through hole 67 that extend between the base 65 and the mid portion 63.

Figure 7:
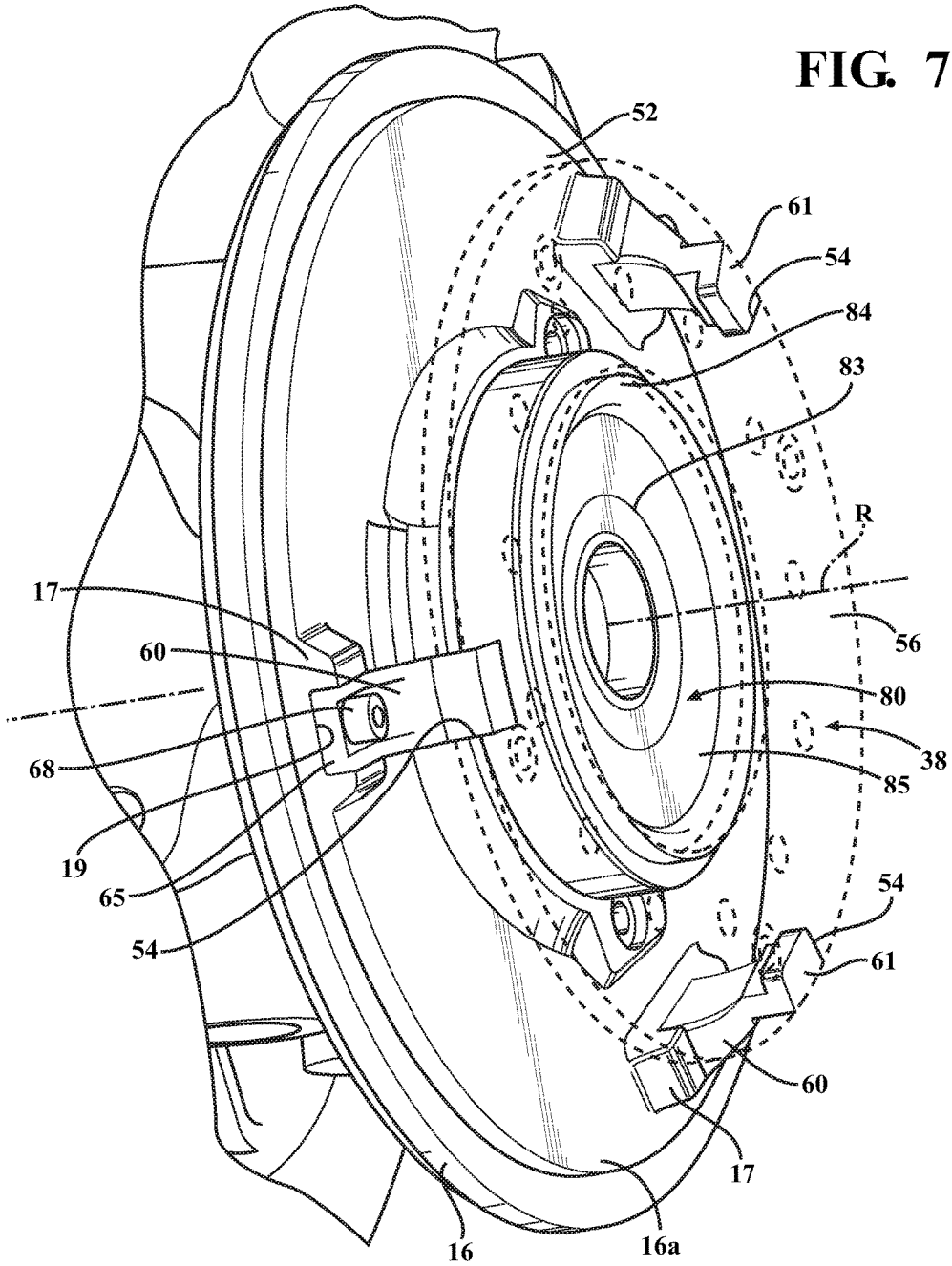
FIG. 7 is a perspective view of the turbine end of the bearing housing with the rotating assembly and portions of the vane ring assembly omitted for clarity and the upper vane ring shown in phantom, showing the upper vane ring biased against the retainers by the spring.

Referring to FIG. 7, the axially outward-facing surface 16a of the bearing housing 16 includes piloting surface features in the form of mounting pads 17. A mounting pad 17 is provided for each retainer 60, and is configured to receive and support the retainer first end 61. In addition, the mounting pads 17 are used to precisely locate and orient the retainers 60 relative to the bearing housing 16. To these ends, each mounting pad 17 is a boss having a central depression 19 dimensioned and shaped to correspond to the retainer first end 61. The depression 19 is precisely machined to provide a planar surface for engagement with the planar end surface 66 of the retainer base 65. In the illustrated embodiment, the mounting pad 17 and depression 19 have a square profile to correspond to the square profile of the retainer base 65. However, the retainer base 65 and mounting pad 17 are not limited to this shape. The mounting pad 17 includes a threaded hole (not shown) that is configured to engage the bolt 68.

Figure 8:
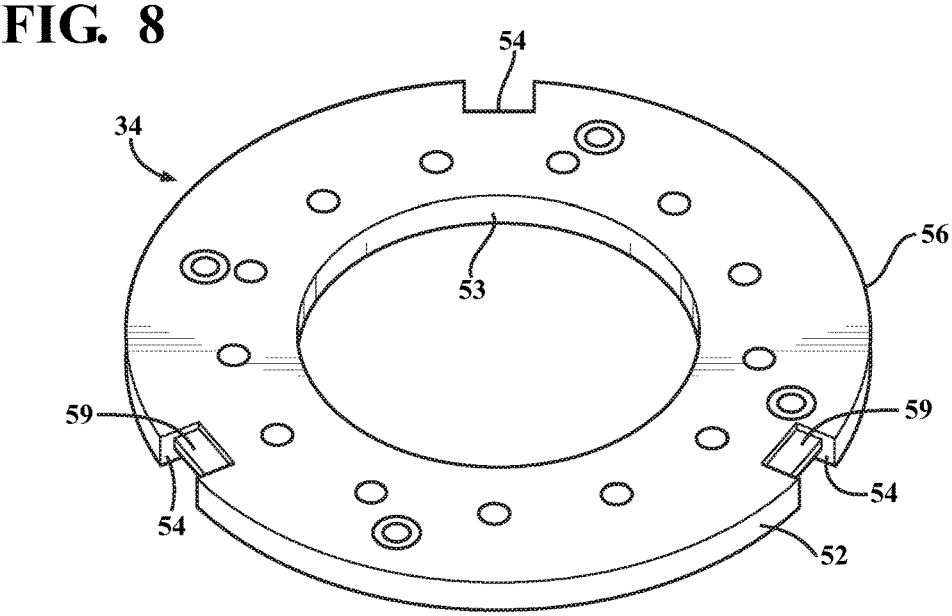
FIG. 8 is a perspective view of the turbine housing-facing surface of the upper vane ring.
Figure 9:
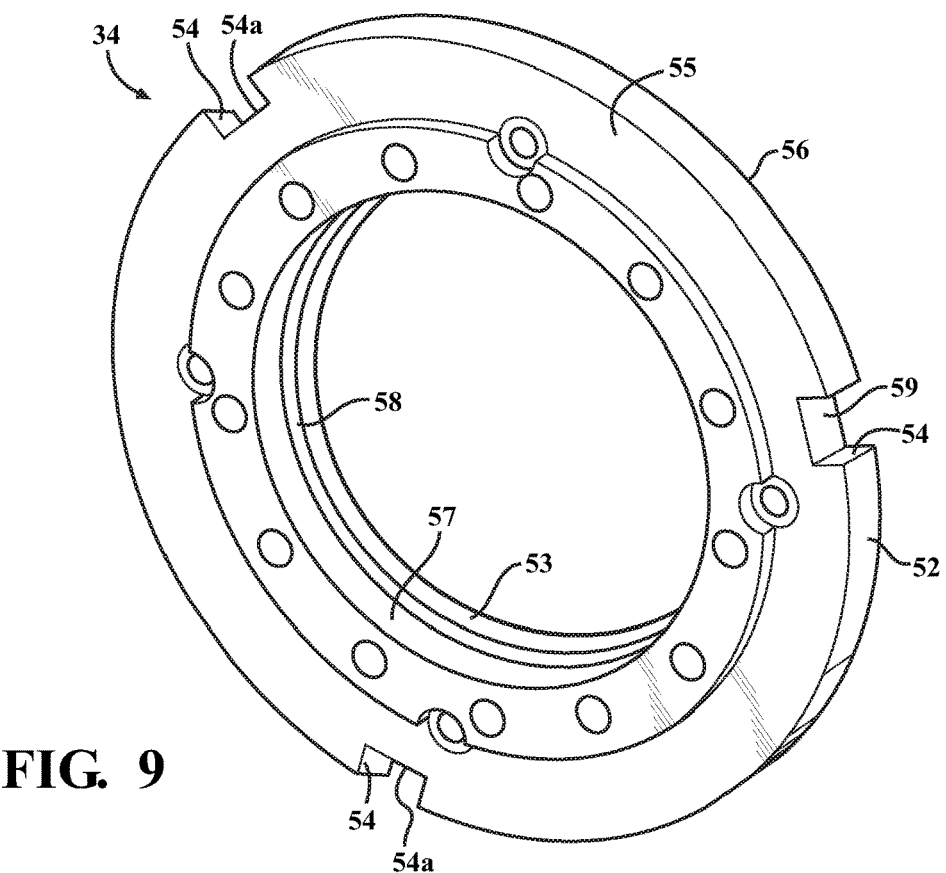
FIG. 9 is a perspective view of the bearing housing-facing surface of the upper vane ring.

Referring to FIGS. 8 and 9, the upper vane ring 34 is an annular plate having a circular outer peripheral edge 52, and a circular inner peripheral edge 53 that is concentric with the outer peripheral edge 52. The upper vane ring 34 includes features that enhance its ability to cooperatively engage with the retainers 60. In particular, equidistantly spaced slots 54 are formed in the outer peripheral edge that are configured to engage with the retainer lip 64. The slots 54 are rectangular in profile and pass through the thickness of the upper vane ring 34 so as to extend between a bearing housing-facing surface 55 of the upper vane ring 34 and a turbine housing-facing surface 56 of the upper vane ring 34. The slots 54 extend radially inward from the outer peripheral edge 52 to a greater extent along the turbine housing-facing surface 56 than along the bearing housing-facing surface 55. As a result, a step 59 is formed at a base 54a (e.g. the radially innermost surface) of each slot 54.

The inner peripheral edge 53 of the upper vane ring 34 is counter-bored on the bearing housing-facing surface 55 so that a bearing housing-facing shoulder 58 is formed along the circumference of the inner peripheral edge 53. The shoulder 58 is used to engage a spring 80, as discussed further below.

In use, the retainers 60 support the vane pack 48 relative to the bearing housing 16 such that the upper vane ring 34 and the lower vane ring 38 are concentric with the turbocharger rotational axis R, axially positioned so that the vanes 30 control the flow of exhaust gas from the turbine volute 10 to the turbine wheel 12, and precisely rotationally oriented relative to the bearing housing 16. To this end, for each retainer 60, the retainer base 65 is disposed within a corresponding mounting pad 17 and bolted thereto via the bolt 68. In addition, the retainer lip 64 is inserted into a corresponding slot 54 of the upper vane ring 34 such that the lip leading edge 72 faces, and is spaced apart from, the slot base 54a such that a first gap g1 (Shown in FIG. 6) exists between the lip leading edge 72 and the slot base 54a. In addition, the lip contact edge 75 abuts a turbine housing-facing surface 59a of the step 59, and the retainer surface 63a faces, and is spaced apart from, a radially outward-facing surface 59b of the step 59 such that a second gap g2 (Shown in FIG. 6) exists between the retainer surface 63a and the radially outward-facing surface 59b of the step 59 (Shown in FIG. 6). The first and second gaps g1, g2 between the radially inward facing surfaces 72, 63a of the retainer 60 and the radially outward-facing surfaces 54a, 59b of the slot 54 allow for thermal growth of the vane pack 48 and retainers 60 during use. In this position, the retainer second end 62 is flush with the turbine housing-facing surface 56 of the upper vane ring 34 in order to retain the desired flow characteristics about the vanes 30. In addition, the retainer outer surface 63b in the region adjoining the second end 62 is continuous with the circumference defined by the upper vane ring outer peripheral edge 52.

Referring again to FIGS. 3 and 7, spring 80, in the form of an annular elastic slightly concave spring member, is disposed between the axially outward-facing surface 16a of the bearing housing 16 and the upper vane ring 34. The spring 80 includes an outer end 84 that engages the upper vane ring shoulder 58, and an inner end 83 that defines a central opening and engages the bearing housing 16. The spring 80 includes an axially protruding ridge 85 adjacent the outer end 84 that extends about a circumference of the outer end 84. The ridge 85 is received within the central opening of the upper vane ring 34 and centers the spring 80 relative to the upper vane ring inner peripheral edge 53.

In this configuration, a turbine housing-facing surface 82 of the spring outer end 84 abuts the bearing housing-facing surface of the upper vane ring shoulder 58, while a bearing housing-facing surface 81 of the spring inner end 83 abuts the bearing housing axially outward-facing surface 16a. As a result, the spring 80 applies an axial force to both the bearing housing axially outward-facing surface 16a and the upper vane ring shoulder 58 which urges these elements to separate. Since the retainers 60 engage a turbine housing-facing surface 56 of the upper vane ring 34, the retainers 60 serve to retain the desired spacing of the upper vane ring 34 from the bearing housing 16 against the biasing force of the spring 80.

Figure 10:
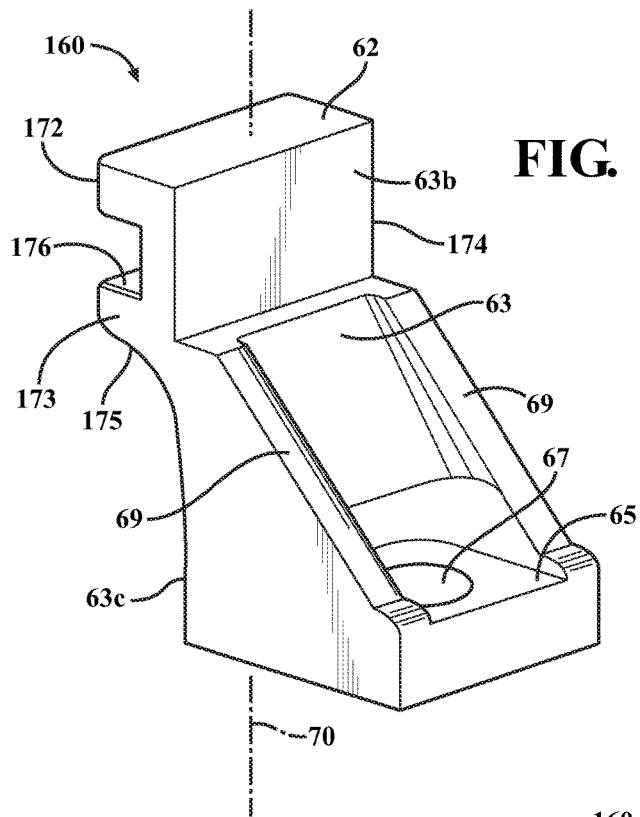
FIG. 10 is a rear perspective view of an alternative embodiment retainer.
Figure 11:
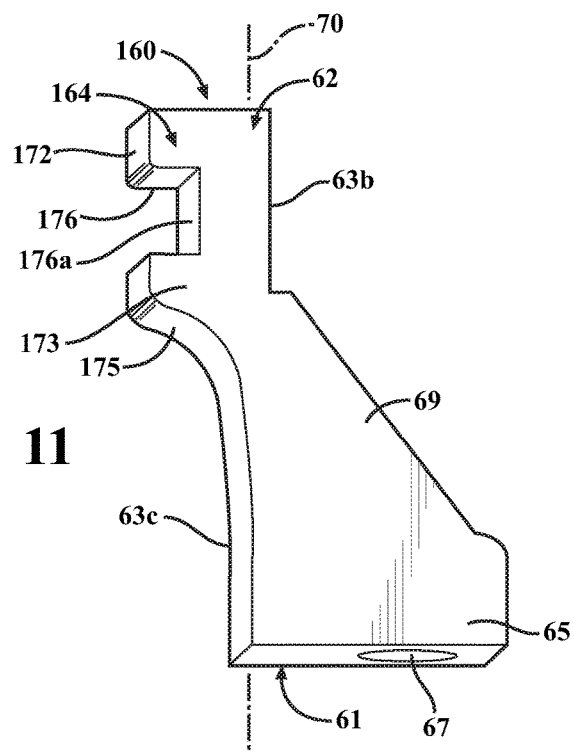
FIG. 11 is a side view of the retainer of FIG. 10.

Referring to FIGS. 10 and 11, alternative embodiment retainers 160 can be used to secure the vane pack 48 to the axially outward-facing surface 16a of the bearing housing 16. The retainers 160 are axially elongated lugs that are spaced apart along a circumference of the vane pack 48. In the illustrated embodiment, three equidistantly s equidistantly spaced retainers 160 are used to secure the vane pack 48 to the bearing housing 16. The retainers 160 are substantially similar in form and function to the retainers 60 described above with respect to FIGS. 4-6. For this reason common reference numbers are used to refer to common elements, and the description is not repeated. The retainers 160 differ from the earlier described retainers 60 with respect to the structure of the lip 164. In addition, the upper vane ring slot 54' is slightly modified from the embodiment shown in FIGS. 8 and 9 in order to accommodate the structure of the lip 64, as discussed further below.

The lip 164 is configured to engage an axially outward-facing surface of the upper vane ring 34. In particular, the lip 164 interlocks with the slot 54' (Shown in FIG. 12A, 12B) formed in an outer peripheral edge 52 of the upper vane ring 34', as discussed further below. The lip 164 is defined by a portion of the retainer second end 62, a leading edge 172, side edges 173, 174 that adjoin the leading edge 172 and an inner edge 175 that is opposed to the retainer second end 62. The leading edge 172 includes a groove 176. The groove 176 is positioned between the retainer second end 62 and the inner edge 175, and defines contact surfaces that engage the slot 54', as discussed further below. The leading edge 172, the groove 176 and the mid-portion 63 may be precisely machined to ensure proper cooperation with the slot 54'.

Figure 12:
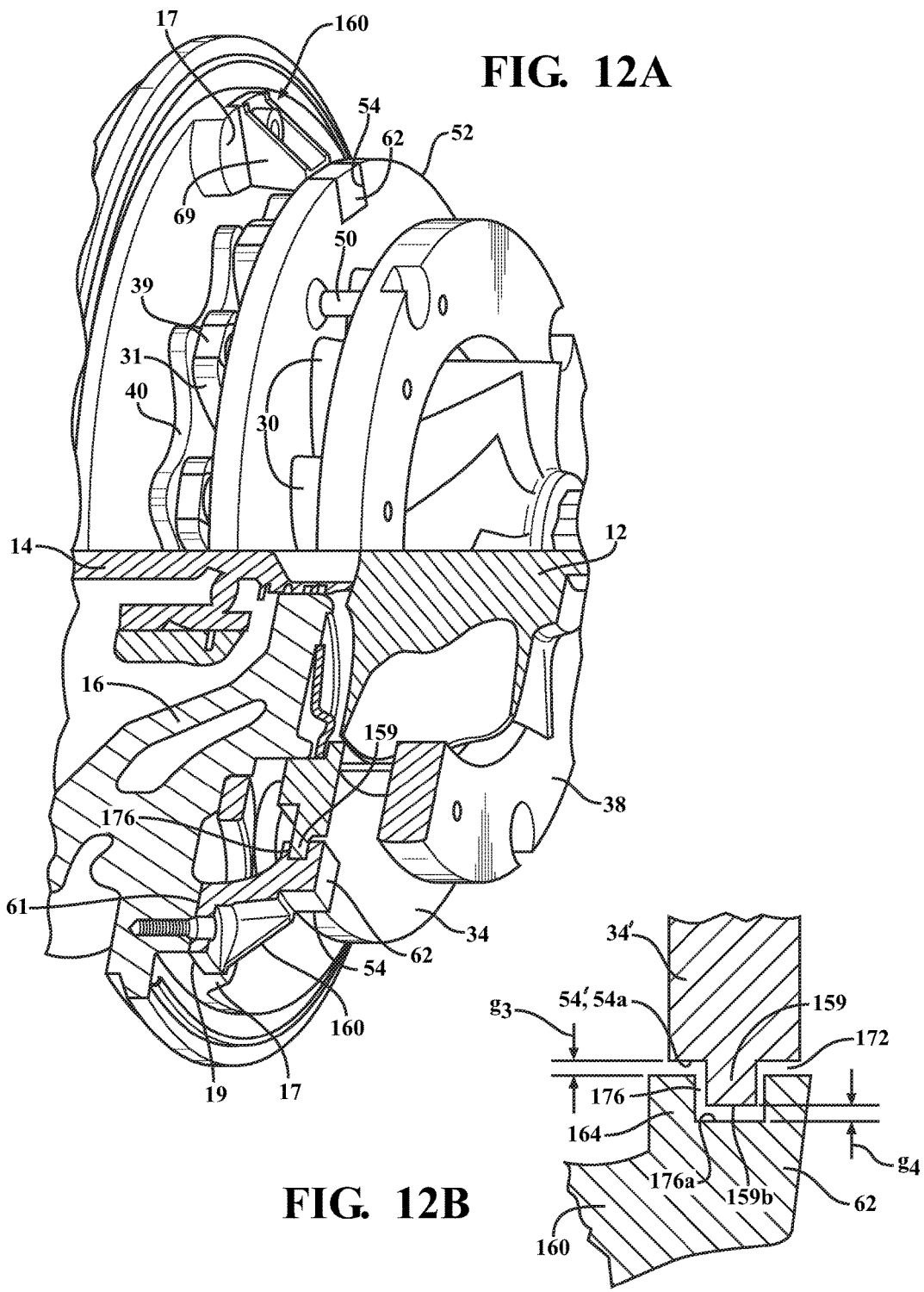
FIG. 12A is a partially cross-sectioned perspective view of a turbocharger including the retainer of FIG. 10.
FIG. 12B is an enlargement of a portion of FIG. 12A detailing the cooperation between the retainer and the upper vane ring.

Referring to FIGS. 12A and 12B, in use, the retainers 160 support the vane pack 48 relative to the bearing housing 16 such that the upper vane ring 34 and the lower vane ring 38 are concentric with the turbocharger rotational axis R, axially positioned so that the vanes 30 control the flow of exhaust gas from the turbine volute 10 to the turbine wheel 12, and precisely rotationally oriented relative to the bearing housing 16. To this end, for each retainer 160, the retainer base 65 is disposed within a corresponding mounting pad 17 and bolted thereto via the bolt 68. In addition, the retainer lip 164 is inserted into, and engages with, a corresponding slot 54' of the upper vane ring 34'.

In particular, the groove 176 receives a rail 159 that protrudes from the slot base 54a'. When the rail 159 is disposed in the groove 176, the lip leading edge 172 faces, and is spaced apart from, the slot base 54a' such that a third gap g3 exists between the lip leading edge 172 and the slot base 54a'. In addition, a base surface 176a of the groove 176 faces, and is spaced apart from, a radially outward-facing surface 159b of the rail 159 such that a fourth gap g4 exists between the groove base surface 176a and the radially outward-facing surface 159b of the rail 159. The third and fourth gaps g3, g4 between the radially inward facing surfaces 172, 176a of the retainer 160 and the radially outward-facing surfaces 54a', 159b of the slot 54' allow for thermal growth of the vane pack and retainers during use. In this position, the retainer second end 62 is flush with the turbine housing-facing surface 56 of the upper vane ring 34 in order to retain the desired flow characteristics about the vanes 30. In addition, the retainer outer surface 63b in the region adjoining the second end 62 is continuous with the circumference defined by the upper vane ring outer peripheral edge 52.

Since the rail 159 is received within the radially-extending groove 176, the retainer 160 constrains the inward and outward axial movement of the upper vane ring 34 along the rotational axis R. Thus, in this embodiment, the spring 80 may be omitted.

Since the vane pack 48 is fixed to the bearing housing 16, the vane pack 48 is thermally decoupled from the turbine housing. Since the vane pack 48 is fixed to the bearing housing via retainers 60, 160 which serve to stand-off the vane pack 48 from the bearing housing 16, the vane pack 48 can, to some extent, also be thermally decoupled from the bearing housing. For example, in some embodiments, the retainer 60, 160 may be formed of a thermally insulating material to limit thermal conduction of heat between the vane pack 48 and the bearing housing 16.

Although the illustrated embodiment has three equidistantly spaced retainers 60, 160 that secure the vane pack 48 to the bearing housing 16, the turbocharger 1 is not limited to this configuration. The number and spacing of retainers 60, 160 is determined by the requirements of the specific application.

Figure 13:
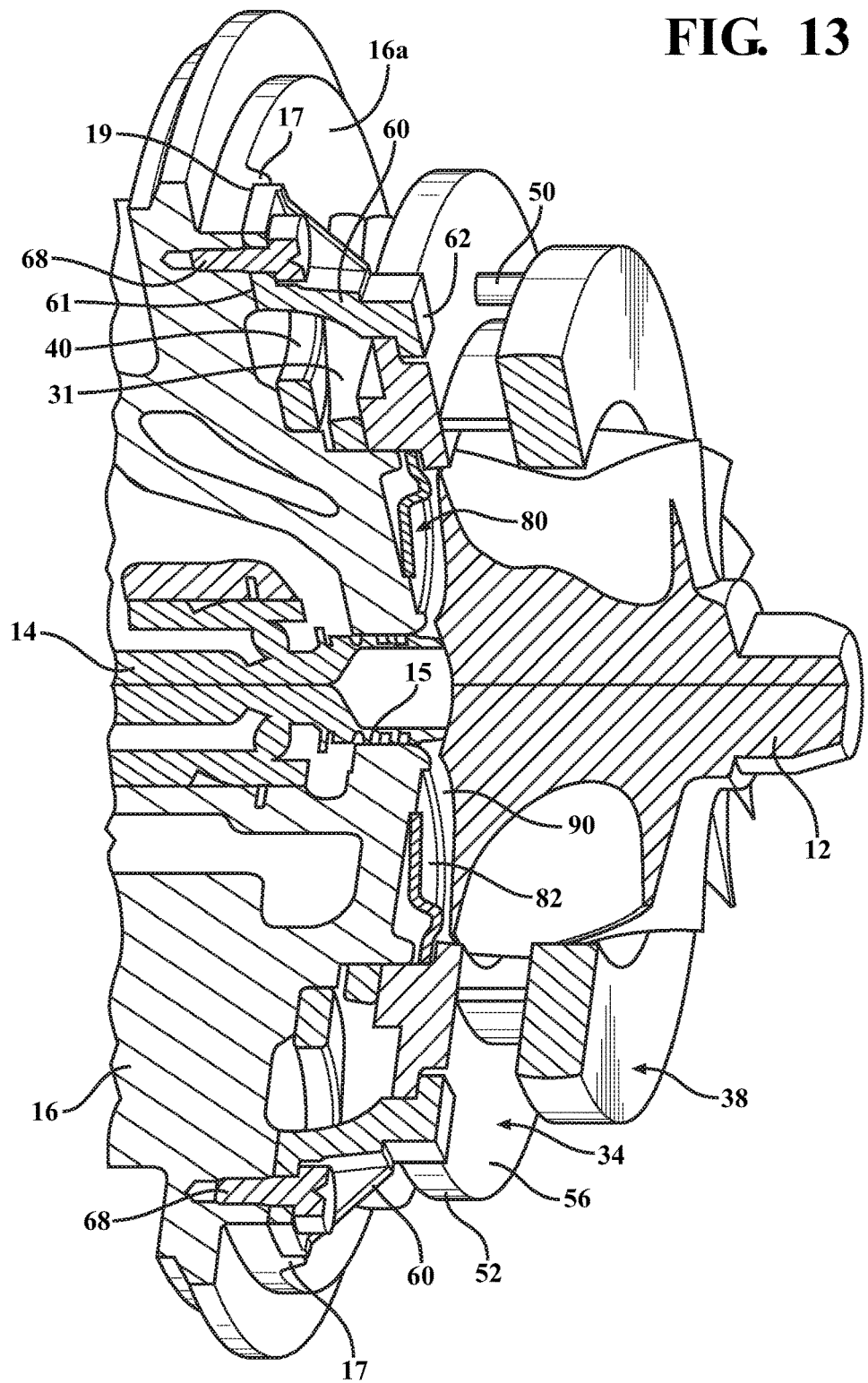
FIG. 13 is a sectioned view of an alternative turbocharger with the turbine housing omitted for clarity illustrating a heat shield disposed between the spring and the upper vane ring.

Referring to FIG. 13, in some embodiments, the turbocharger 1 includes a heat shield 90 axially disposed between the spring 80 and the turbine wheel 12. The heat shield 90 is a thin annular plate that extends radially between the upper vane ring inner peripheral edge 53 and the bearing housing 16 in the vicinity of the bore 15. The heat shield 90 faces a backwall of the turbine wheel 12 and deflects heat away from the spring 80 and the bearing housing 16.

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

What is claimed is:

1. A variable turbine geometry turbocharger (1) comprising
    a bearing housing (16) including a bore (15) that defines a longitudinal axis (R);
    a turbine housing (4) secured to the bearing housing (16) and defining an exhaust gas inlet (6), an exhaust gas outlet (8) and a volute (10) disposed between the exhaust gas inlet (6) and the exhaust gas outlet (8);
    a turbine wheel (12) disposed in the turbine housing (4) between the volute (10) and the exhaust gas outlet (8);
    a vane ring assembly (29) disposed in the turbine housing (4) between the volute (10) and the turbine wheel (12), the vane ring assembly (29) including pivotable vanes (30) disposed about the circumference of the turbine wheel (12) and controlling the flow of exhaust gas to the turbine wheel (12);
    the vane ring assembly (29) comprises an upper vane ring (34) disposed between the vanes (30) and the bearing housing (16), and a lower vane ring (38);
    at least three retainers (60, 160) that secure the vane ring assembly (29) to the bearing housing (16) and which are spaced apart along an outer peripheral circumference of the vane ring assembly (29);
    wherein the at least three retainers (60, 160) each comprise a first end (61) that is fixed to the bearing housing (16) and a second end (62) that engages a corresponding slot (54, 54') on an axially outward facing surface of the upper vane ring of the vane ring assembly (29);
    the bearing housing (16) includes surface features (17) that engage the respective first ends (61) of each of the at least three retainers (160); and
    whereby the at least three retainers (160) serves to retain the vane ring assembly (29) in a predetermined rotational orientation relative to the bearing housing (16).

2. The turbocharger (1) of claim 1, wherein the at least three retainers respective first ends (61) are axially spaced relative to the respective retainer second ends (62), whereby the at least three retainers (60, 160) retains the vane ring assembly (29) at a predetermined axial spacing relative to an axially outward-facing end face (16a) of the bearing housing (16).

3. The turbocharger (1) of claim 1, wherein the at least three retainers respective second ends (62) includes a radially inward protrusion (64, 164) that engages the axially outward facing surface (56) of the upper vane ring of the vane ring assembly (29).

4. The turbocharger (1) of claim 3, wherein the vane ring assembly (29) is spring biased toward an axially outward position relative to the bearing housing (16), and the at least three retainers (60, 160) retain the vane (30) ring in a desired axial position relative to the bearing housing (16) against the spring bias.

5. The turbocharger (1) of claim 1, wherein each of the retainer second ends (62) include a groove (176) that receives a portion of the upper vane ring.

6. The turbocharger (1) of claim 1, wherein
    the lower vane ring (38) is axially spaced relative to the upper vane ring (34) via spacers (50),
    the vanes (30) are disposed between, and supported for rotation on, the upper vane ring (34) and the lower vane ring (38).

7. The turbocharger (1) of claim 1, comprising
    an elastic element (80) compressed between the bearing housing (16) and the vane ring assembly (29) whereby the elastic element (80) applies an axial force to the vane ring assembly (29) that urges the vane ring assembly (29) in a direction away from the bearing housing (16).

8. The turbocharger (1) of claim 7, wherein the elastic element (80) is an annular plate having an outer end (84) that engages the vane ring assembly (29), and an inner end (83) that engages the bearing housing (16).

9. The turbocharger (1) of claim 8, wherein
    the lower vane ring (38) is axially spaced relative to the upper vane ring (34) via spacers (50),
    the vanes (30) are disposed between and supported for rotation on the upper vane ring (34) and the lower vane ring (38), and
    the elastic element (80) includes an axially protruding ridge (85) adjacent the outer end (84) that extends about a circumference of the outer end (84), the ridge (85) piloting the elastic element (80) relative to an inner end (83) of the upper vane ring (34), and the outer end (84) of the elastic element (80) abuts a bearing housing-facing surface (55) of the upper vane ring (34).

10. The turbocharger (12) of claim 7, wherein a heat shield (90) is disposed between the elastic element (80) and the turbine wheel (12).

* * * * *